United States Patent [19]

Hwang

[11] Patent Number: 5,609,758

[45] Date of Patent: Mar. 11, 1997

[54] CONTAINER WITH SLIDING COVER AND STRAINER MEANS

[76] Inventor: Chyh-Wen Hwang, 12F-1, No. 311, Chung Hsiao E. Rd., Sec. 4, Taipei, Taiwan

[21] Appl. No.: 512,087

[22] Filed: Aug. 7, 1995

[51] Int. Cl.⁶ .................................................. B01D 35/00
[52] U.S. Cl. .......................................... 210/244; 210/477
[58] Field of Search .................................. 210/244, 245, 210/246, 419, 473, 476, 477; 99/536; 4/242.1, 641, 652; 220/252, 254, 262, 264, 326, 353, 354, 445, 447

[56] References Cited

U.S. PATENT DOCUMENTS

| | | | |
|---|---|---|---|
| 1,387,789 | 8/1921 | Lyons | 210/244 |
| 2,650,485 | 9/1953 | Greca | 210/477 |
| 5,064,535 | 11/1991 | Hsu | 210/477 |

FOREIGN PATENT DOCUMENTS 11357 of 1889 United Kingdom ................... 210/477

Primary Examiner—Matthew O. Savage

[57] ABSTRACT

A container including a hollow, rounded casing having upright stub rods on the inside and a tubular foot and a center through hole, a bowl mounted on the upright stub rods inside the casing and having an outward top flange and a bottom drain pipe extended out of the center through hole on the casing, a plurality of guide rods connected between the upright stub rods of the casing and the outward top flange of the bowl, and two symmetrical cover halves moved along the guide rods to close/open the bowl.

4 Claims, 6 Drawing Sheets

CONTAINER WITH SLIDING COVER AND STRAINER MEANS

BACKGROUND OF THE INVENTION the present invention relates to a bowl-like container which comprises a bowl mounted inside a hollow rounded casing, and a sliding cover moved between two opposite locations to close/open the bowl.

Bowls, dishes, and various other containers are used in kitchen for holding fruits, vegetables, etc. When a container is used for holding water-washed fruits or vegetables, water drops from the fruits or vegetable will be maintained on the inside of the container, causing the fruits or vegetables to spoil. If a container which is used to hold eatable things is not covered with a cover, the eatable things will be covered with dust or contaminated by vermin. However, because the covers of regular food containers are separately prepared, they tend to be missed. Furthermore, regular food containers commonly have no carrying handles, therefore they must be held with both hands when they are carried.

SUMMARY OF THE INVENTION present invention has been accomplished to provide a container which eliminates the aforesaid drawbacks. It is one object of the present invention to provide a container which has a strainer for straining liquid. It is another object of the present invention to provide a container which has carrying handles for carrying by hand. It is still another object of the present invention to provide a container which has a cover that can be conveniently opened and closed for protection against dust. According to one embodiment of the present invention, the container comprises a hollow, rounded casing having upright stub rods on the inside and a tubular foot and a center through hole, a bowl mounted on the upright stub rods inside the casing and having an outward top flange and a bottom drain pipe extended out of the center through hole on the casing, a plurality of guide rods connected between the upright stub rods of the casing and the outward top flange of the bowl, and two symmetrical cover halves moved along the guide rods to close/open the bowl.

DETAILED DESCRIPTION OF THE PREFERRED EMBODIMENT

Figure 1:
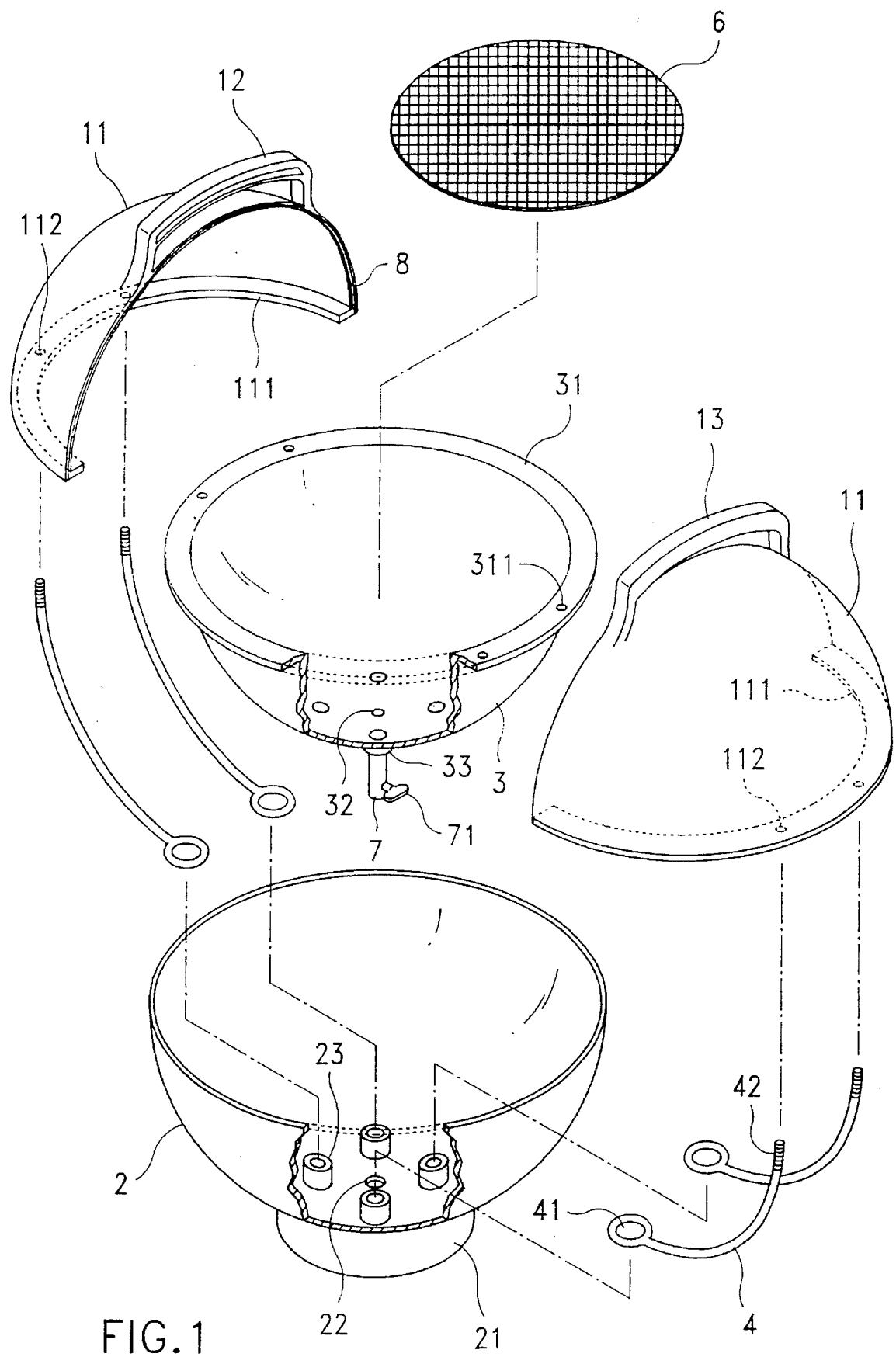
FIG. 1 is an exploded view of a container according to one embodiment of the present invention.
Figure 2:
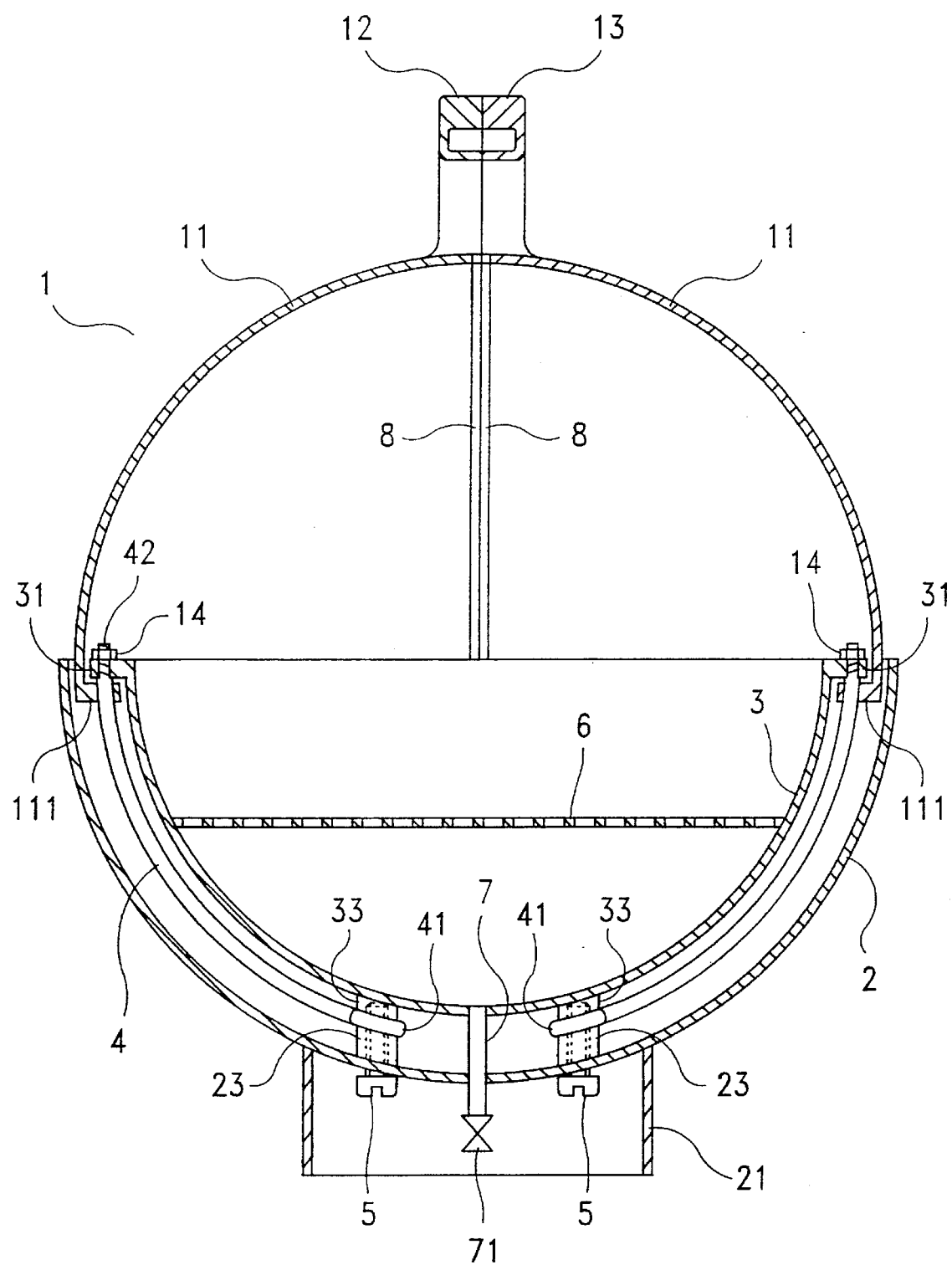
FIG. 2 is a longitudinal assembly view in section of the container shown in FIG. 1.
Figure 3:
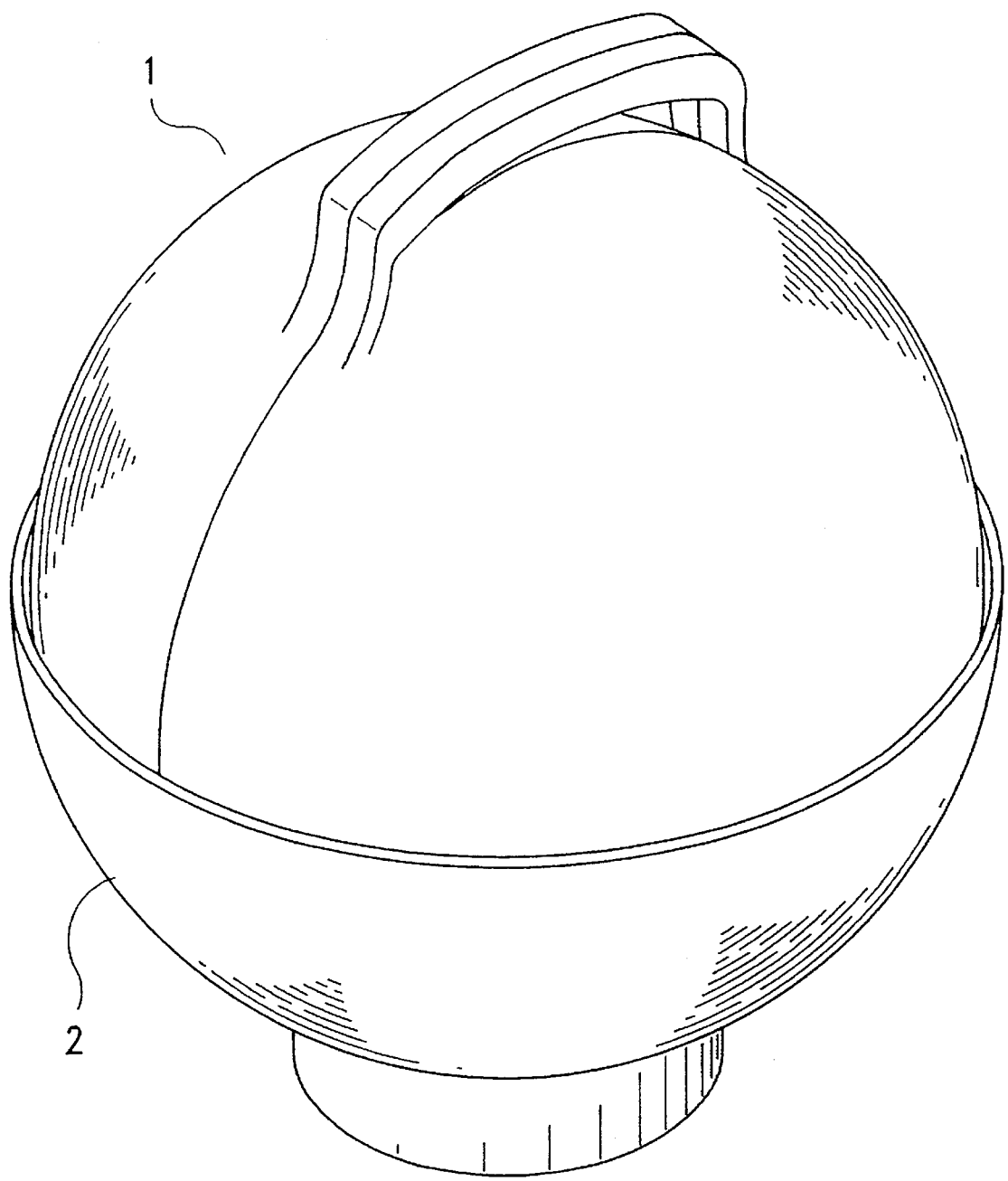
FIG. 3 is an elevational view of the container shown in FIG. 1, showing the top cover closed.

Referring to FIGS. 1, 2, and 3, a container in accordance with the present invention is generally comprised of a top cover 1, a hollow, rounded casing 2, a bowl 3, a plurality of guide rods 4, a drain pipe 7, and a strainer 6. The top cover 1 is comprised of two symmetrical cover halves 11, that can be moved relative to each other to close and open the container. The respective open edge of each cover half 11 is covered with a respective rubber packing strip 8 to form a respective mating edge, therefore no noise will be produced when the cover halves 11 are abutted against each other to close the container. Each cover half 11 further comprises a carrying handle 12 or 13 at the top, an inward flange 111 at the bottom around the border, and two through holes 112 on the inward flange 111. The casing 2 comprises a hollow foot 21 at the bottom, a center through hole 22 at the center, and a plurality of upright stub rods 23 on the inside around the center through hole 22 for supporting the bowl 3 inside the casing 2. The bowl 3 comprises an outward top flange 31 around the rim, two symmetrical pairs of through holes 311 corresponding to the through holes 112 on the inward flanges 111 of the cover halves 11, a drain hole 32 at the center corresponding to the drain hole 22 on the casing 2, a plurality of mounting holes 33 around the drain hole 32, a drain pipe 7 extended from the drain hole 32 on the outside and inserted through the center through hole 22 on the casing 2, and a water valve 71 mounted in the drain pipe 7 and suspended outside the casing 2 within the hollow foot 21. The guide rods 4 each has one end terminating in a mounting ring 41 and an opposite end terminating in a screw rod 42. The strainer 6 is mounted within the bowl 3 for straining liquid.

Referring to FIGS. 2 and 3 again, the inward flanges 111 of the cover halves 11 are respectively attached to the bottom side of the outward flange 31 of the bowl 3, then the mounting rings 41 of the guide rods 4 are respectively mounted around the upright stub rods 23, and then the mounting holes 33 of the bowl 3 are respectively fastened to the upright stub rods 23 of the casing 2 by fastening elements 5 (for example, screw bolts), permitting the screw rods 42 of the guide rods 4 to be respectively inserted through the through holes 112 on the cover halves 11 and the through holes 311 on the bowl 3 and screwed up with a respective nut 14. When assembled, the cover halves 11 can be moved in the space within the casing 2 and the bowl 3 along the guide rods 4 between the close position to close the bowl 3 and the open position to open the bowl 3.

Figure 4:
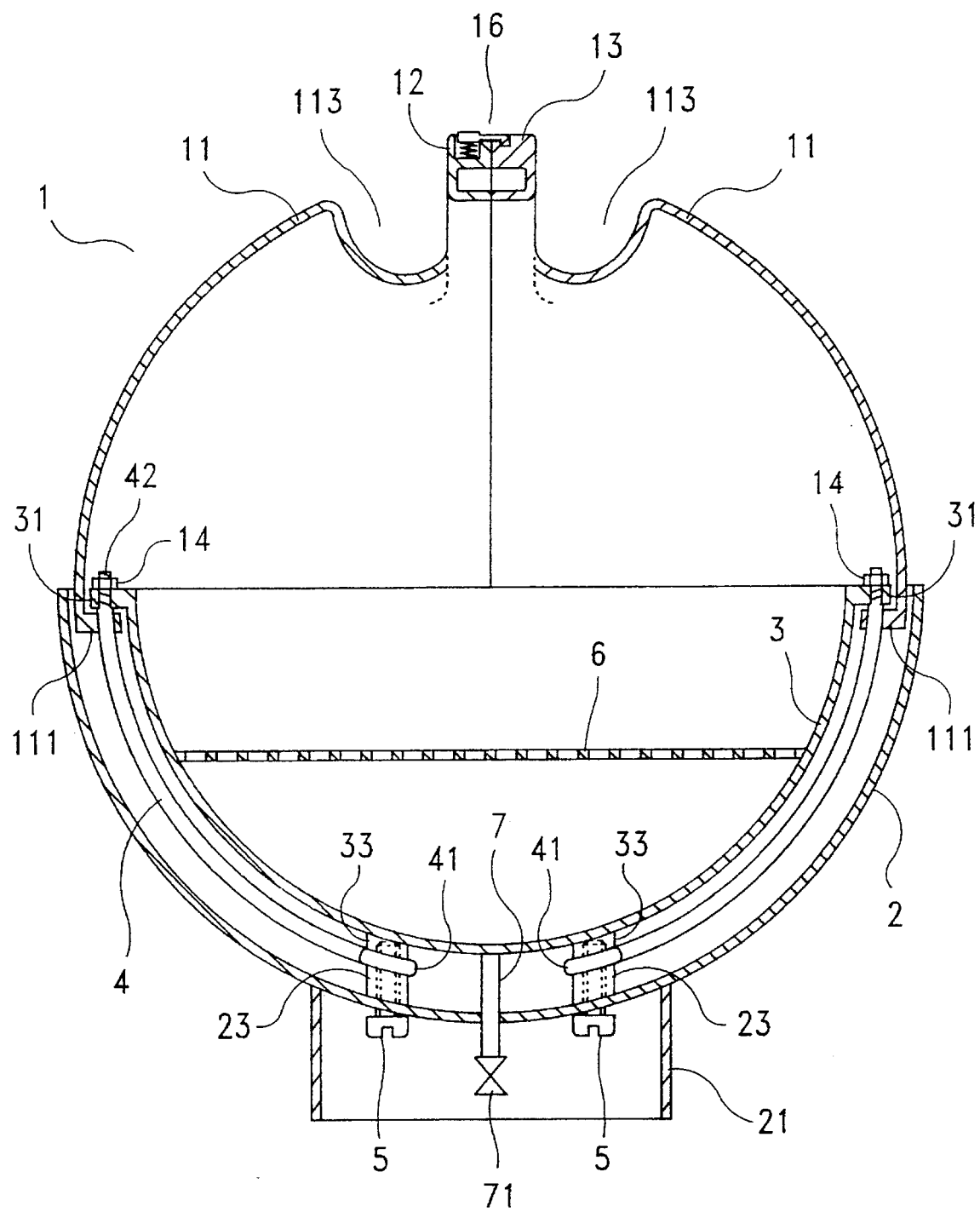
FIG. 4 is a longitudinal assembly view in section of an alternate form of the container according to the present invention.

Referring to FIG. 4, concave portions 113 may be respectively made on the cover halves 11 adjacent to the carrying handles 12 and 13 so that the fingers can be conveniently inserted into position to hold the carrying handle 12 or 13.

Figure 5:
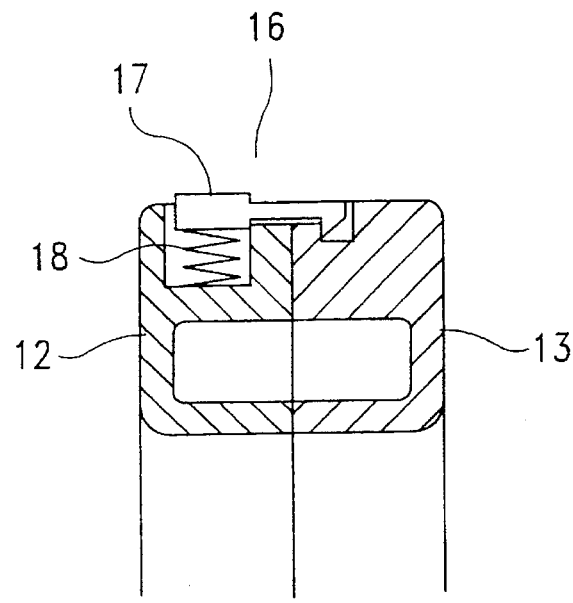
FIG. 5 is a sectional view showing the installation of a locking device in the carrying handles of the cover halves for the container according to the present invention.
Figure 6:
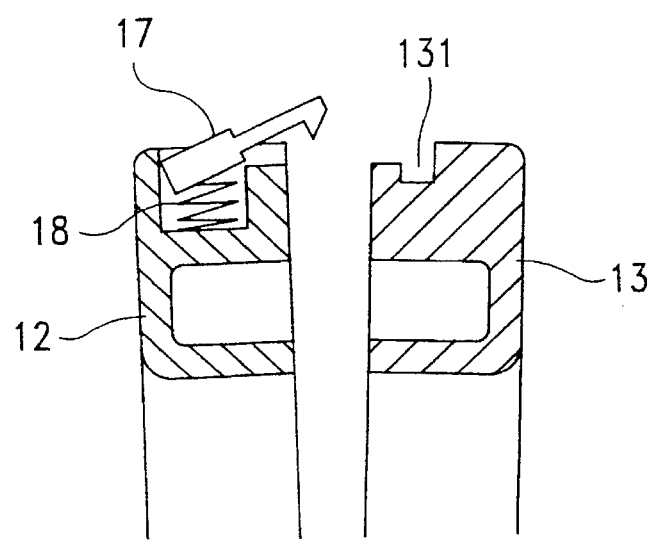
FIG. 6 is similar to FIG. 5 but showing the locking device unlocked and the carrying handles disconnected from each other.

Referring to FIGS. 5 and 6, a cover lock 16 is provided and installed in the carrying handles 12 and 13 for locking the cover halves 11 in the close position. The cover lock 16 comprises a hook 17 supported on a spring 18 mounted on one carrying handle 12, and a retaining hole 131 mounted on the other carrying handle 13. When the hook 17 is hooked on the retaining hole 131, the cover halves 11 are locked in the close position (see FIG. 5). When the hook 17 is released from the retaining hole 131, the carrying handles 12 and 13 (i.e., the cover halves 11) can be moved apart to open the bowl 3. Magnets of reversed poles (not shown) may be installed in the carrying handles 12 and 13 to replace the aforesaid locking device for holding the carrying handles 12 and 13 together when the cover halves 11 are moved to each other.

Figure 7:
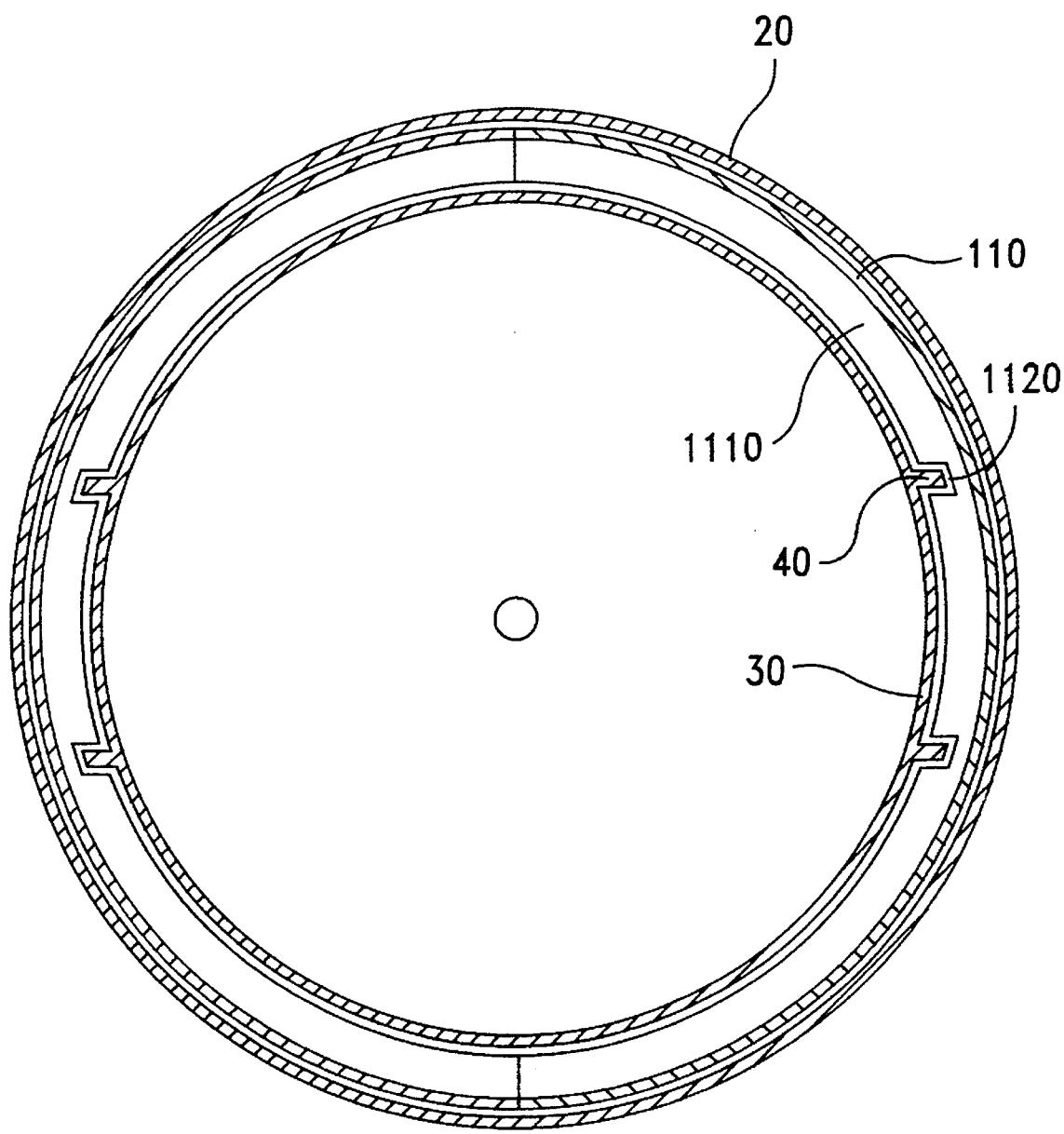
FIG. 7 is a transverse view in section of another alternate form of the present invention.

FIG. 7 shows another alternate form of the present invention. This alternate form also comprises a hollow, rounded casing 20, a bowl 30 mounted within the casing 20, and two symmetrical cover halves 110 moved between the casing 20 and the bowl 30 to close/open the bowl 30. The cover halves 110 each has an inward flange 1110 and a plurality of sliding grooves 1120 extended from the outward flange 1110 to the respective center. The bowl 3 has a plurality of rails 40 raised from the outside wall and fitted into the sliding grooves 1120 on the cover halves 110 for guiding the movement of the cover halves 110 between the casing 20 and the bowl 30. This alternate form eliminates the installation of the aforesaid guide rods 4.

It is to be understood that the drawings are designed for purposes of illustration only, and are not intended as the limits and scope of the invention disclosed.

I claim:

1. A container comprising:

a hollow, rounded casing having a hollow foot on a bottom of said casing, a center through hole through a center of said casing, a plurality of upright stub rods on an inside of said casing around the center through hole of said casing;

a bowl mounted within said casing, said bowl comprising a rim, an outward top flange around said rim, a drain hole at a center of said bowl, a plurality of mounting holes around said drain hole respectively fastened to said upright stub rods of said casing by fastening elements, a drain pipe extended from said drain hole and inserted through the center through hole on said casing;

a strainer mounted within said bowl;

a top cover for covering said bowl, said top cover comprising two symmetrical cover halves each having a mating edge, wherein said cover halves are guided by track means between a first position in which said mating edges abut one another to close said bowl and a second position to open said bowl, each cover half having an inward bottom flange stopped by the outward flange of said bowl within a space defined between said bowl and said casing, and a top carrying handle on top of each cover half for carrying by hand;

wherein said track means comprises a plurality of guide rods, each guide rod having a mounting ring at one end mounted around one upright stub rod on said casing and a screw rod at an opposite end inserted through a respective through hole on the inward flange of said cover half and a respective through hole on the outward flange of said bowl, a plurality of nuts, and each said nut being screwed onto a respective said screw rod to retain the cover halves and the bowl to said casing; and lock means for locking said cover halves in said first position.

2. The container of claim 1 wherein the mating edge of each said cover half is formed by a respective rubber packing strip covering an open edge of each cover half.

3. The container of claim 1 wherein said lock means comprises a retaining hole mounted on the carrying handle of one cover half, and a spring supported hook mounted on the carrying handle of the other cover half for hooking on said retaining hole when said cover halves are moved to said first position.

4. The container of claim 1 wherein said fastening elements are screw bolts.

* * * * *